United States Patent [19]

Parrish

[11] Patent Number: 4,674,673
[45] Date of Patent: Jun. 23, 1987

[54] FLUID DISTRIBUTOR, AND A METHOD OF AFFIXING EXTENSIONS TO THE FLUID DISTRIBUTOR

[75] Inventor: James R. Parrish, Lockhart, Tex.

[73] Assignee: Chatleff Controls, Inc., Buda, Tex.

[21] Appl. No.: 761,564

[22] Filed: Aug. 1, 1985

[51] Int. Cl.⁴ ............................................. B23K 31/02
[52] U.S. Cl. .................................... 228/174; 228/248; 228/245
[58] Field of Search ........................ 228/174, 248, 245; 29/157 C, 157.4, 157 R; 62/525

[56] References Cited

U.S. PATENT DOCUMENTS

| 2,436,476 | 2/1948 | Kulesh | 228/245 |
| 3,563,055 | 2/1971 | Owens | 62/525 |

FOREIGN PATENT DOCUMENTS

| 1198600 | 12/1959 | France | 228/245 |

Primary Examiner—Nicholas P. Godici
Assistant Examiner—G. M. Reid
Attorney, Agent, or Firm—Arnold, White & Durkee

[57] ABSTRACT

A fluid handling body and a method of attaching extension tubes to the fluid handling body which effectively seals the tubes to the body in a simple manufacturing operation, reducing the number of manufacturing operations required while minimizing the possibilities of damage to the tubes or undesirably restricting the fluid flow path in the body or tubes. The method hereof is particularly advantageous where several tubes are to be attached to the body to produce a precise, leak-free component. The body includes a fluid flow passageway extending into one end and a saucer-like cavity in the other end. A plurality of bores extend through the body between the cavity and passageway. With the tubes received in the bores, a paste is applied in the cavity. The outer periphery of the body is heated, melting the paste in a single heating operation and effecting flow of the paste in the cavity into circumscribing relation about the tubes.

16 Claims, 4 Drawing Figures

U.S. Patent  Jun. 23, 1987  4,674,673
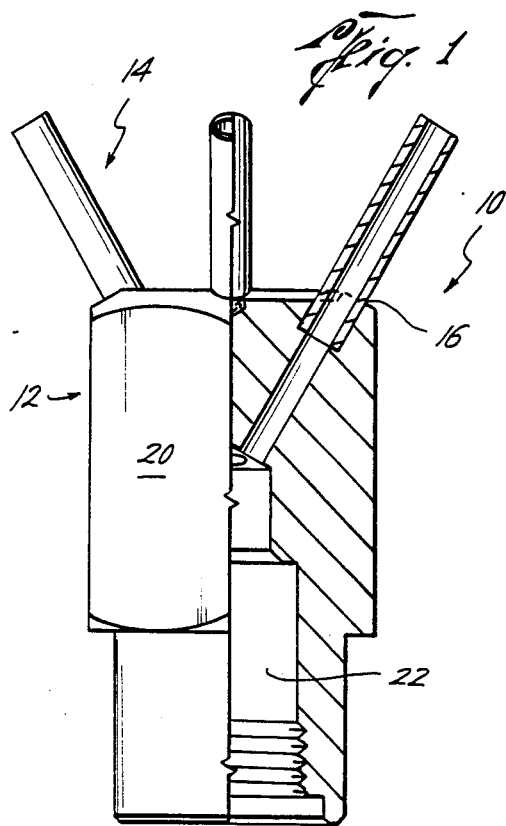
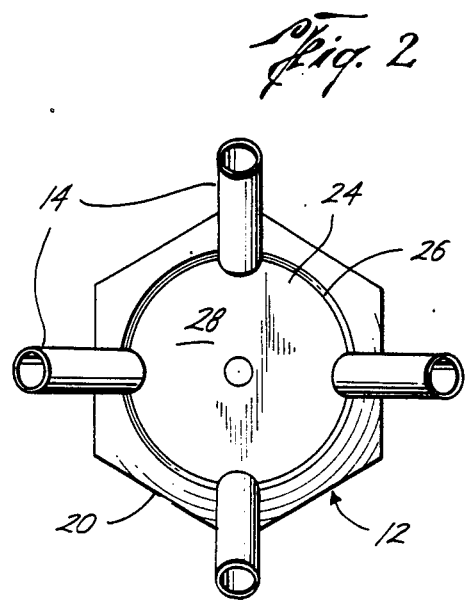
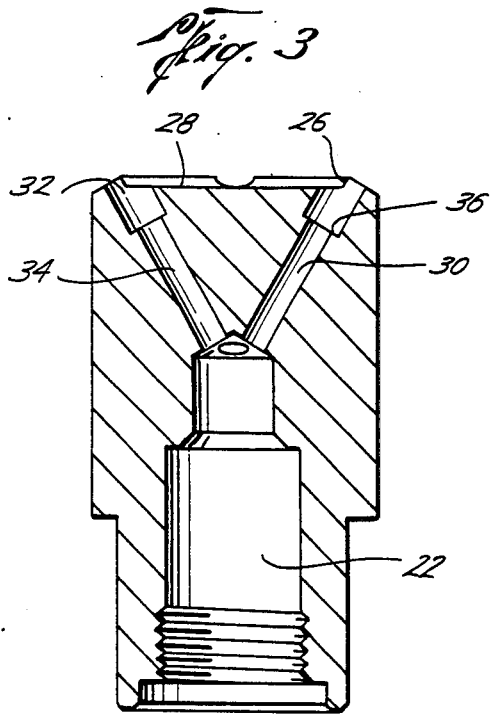
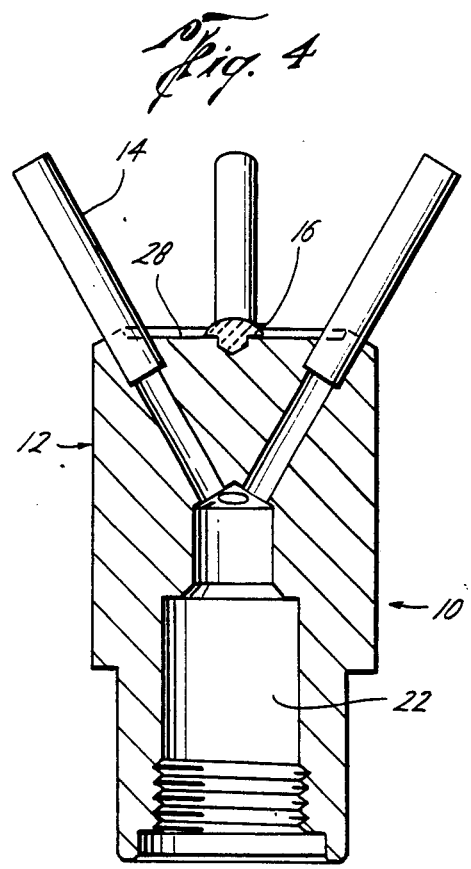

FLUID DISTRIBUTOR, AND A METHOD OF AFFIXING EXTENSIONS TO THE FLUID DISTRIBUTOR

BACKGROUND OF THE INVENTION

1. IField of the Invention

This invention relates generally to a method for attaching extensions to a body. In particular, it relates to a method of attaching tubular extensions to a fluid distributing body using a single heating operation to seal the extensions into operable communication with the body.

2. Description of the Prior Art

Generally speaking, when it is necessary to secure metal extensions to a metal body, the extensions are welded, brazed, or soldered into the appropriate position. Typically, the extensions are all held in the proper position by the metal body and/or a manufacturing jig, then the attaching operation is commenced (e.g. welded, soldered, brazed, etc.). Heat is applied to the individual joint and after a sufficient temperature is reached, filler material is introduced to the joint. After attaching one extension, the heat source is typically rotated and the second extension attached in the same manner. This operation would continue for succeeding extensions until all the extensions had been attached to the body.

A prime difficulty with such conventional manufacturing methods is the time and expense associated with performing a large number of discrete operations in producing a single piece. Even with robotics and automated jigs, performing each additional manufacturing step adds undesirable manufacturing cost to the part.

These difficulties are exacerbated when it is necessary to attach many tubular extensions to a fluid handling body to produce a fluid distributor or the like. Such fluid distributors are useful in refrigerant systems as distribution devices, collection devices or combinations thereof and may even perform as an expansion device. In refrigerant systems, such fluid handling distributors often employ a plurality of tubes which must be attached to the fluid handling body during manufacture.

Attaching such tubular extensions to a body is difficult using conventional techniques. As outlined previously, conventional manufacturing techniques leads to a large number of discrete manufacturing operations for attaching each extension to the body. Further, if the extension tube has a small inside diameter—common in refrigerant systems—the manufacturing operation to attach such tubes must be precise and can be time consuming. For example, excessive heat or repeated heating from soldering, welding or brazing can partially melt or oxidize the flux and/or filler, produce fatigue stress in the metal, or lead to an arcuate fluid flow path. Another difficulty in attaching tubular extensions to a fluid handling body is that an effective seal must be made around each tubular extension to prevent undesirable leakage. Here again, conventional attachment manufacturing techniques must be exact and are therefore expensive. Still another problem with attaching tubular extensions to a fluid handling body results from the necessity of preventing, weld, solder, filler, etc. used in the attachment operation from lodging in a fluid flow path of the fluid distributor. Such contamination in a fluid flow path presents a restriction which could alter and effect the fluid handling characteristics of the fluid distributor. Of course, with a plurality of extensions which must be attached - each extension requiring several discrete manufacturing operations - the probability of error or manufacturing flaw increases dramatically.

SUMMARY OF THE INVENTION

The problems outlined above are in large measure solved by the method for attaching extensions to a body of the present invention. That is, the method hereof provides for a simple manufacturing operation which quickly, accurately, and inexpensively affixes the extensions to the body. Further, when attaching tubular extensions to a fluid handling body, the method hereof effectively seals the tubular extensions and decreases the probability of undesirable restriction of a fluid flow path. When the present method is used to attach a plurality of tubular extensions, the extensions are easily handled and potential damage or manufacturing error minimized.

Broadly speaking, the method of the present invention contemplates providing a body with a cavity on the surface and a plurality of bores in communication with a cavity. An elongated extension is placed in each of the respective bores to extend outwardly from the body and a paste or attachment material is applied in the cavity. The body is directly heated, indirectly melting the paste which flows in the cavity into circumscribing relation about the extensions. Preferably, the paste is a slurry having a flux component and a filler component; heating causing the flux to flow in the cavity to provide a flow path for the filler. Of course, many other types of fillers and flux can be used (e.g. solid filler and reducing or shielding gas flux).

The fluid distributor corresponding to the method of the present invention generally includes an elongated body with a plurality of tubular extensions extending outwardly from the body. The body presents a passageway extending inwardly from one end and a generally open cavity at the other end. A plurality of bores extend between the cavity and the passageway. The cavity has a retaining flange along the outer periphery with filler paste received in the cavity in sealing disposition about the extensions. Preferably, the cavity is a generally saucer-like indentation in the body surface and is generally convex in cross-section to define a dome in the center of the cavity. The bores preferably extend inwardly from the cavity adjacent the flange - with the tubular extensions received in the bores the paste effectively seals and secures the extensions in the bores.

BRIEF DESCRIPTION OF THE DRAWINGS

FIG. 1 is an elevational view in partial section showing the fluid distributor of the present invention;

FIG. 2 is a top plan view of the fluid distributor hereof;

FIG. 3 is a vertical sectional view of a fluid handling body at the beginning stage of manufacture; and FIG. 4 illustrates a fluid distributor in partial section at an intermediate stage of manufacture.

DESCRIPTION OF THE PREFERRED EMBODIMENTS

Turning now to the drawing, a fluid distributor 10 in accordance with the present invention is illustrated and broadly includes an elongated fluid handling body 12, a plurality of tubular extensions 14, and braze filler 16 securing the extensions 14 to the body 12.

In more detail, the fluid handling body 12 is roughly an elongated cylinder having an outer hex-head periphery 20. A coaxial, generally cylindrical, passageway 22 extends into the body from one end and terminates at an approximately central location. The passageway 22 is preferably threaded at the distal end for attaching the fluid distributor 10 in a refrigerant system and has a reduced diameter portion in a proximal location to develop the desired fluid characteristics while passing a fluid through the passageway 22 (e.g. expansion of a refrigerant).

The other end of the body 12 presents structure defining an axially oriented cavity 24 (see FIG. 2). Preferably, the cavity 24 is a generally saucer-like indentation in the axial surface of the body and presents a dam or flange 26 along its outer perimeter. As shown in FIG. 2, the saucer-like cavity 24 is circular in plan and includes a bottom 28. In cross-section, FIG. 4 illustrates the bottom 28 with a slight convex configuration to define a dome; FIG. 3 illustrates a variation in that the bottom 28 is rectilinear in cross-section to present a generally planar bottom surface. As particularly evident in FIGS. 2 and 4, a small deformation is located in the center of the cavity; this deformation is primarily the result of the machining process.

A plurality of bores 30 operably communicate between the cavity 24 and the passageway 22. The bores 30 are preferably circumferentially spaced in a symmetrical fashion adjoining the flange 26 (see e.g. FIG. 3). Each bore 30 presents a first section 32 adjoining the cavity 24 and a second section 34 adjoining the passageway 22 (see FIG. 3). The first section 32 is circular in cross-section and dimensioned to have a slightly larger diameter than the outside diameter of the tubular extensions 14 for receiving the extensions therein. The second section 34 has a smaller diameter, thus defining a shoulder 36 between the first and second sections 32, 34. The tubular extensions 14 are inserted into the first section 32 and abut the shoulder 36 as shown in FIGS. 1, 4.

In the preferred embodiment, a braze filler 16 is utilized as the bonding material to affix the tubular extensions 14 to the body 12. Preferably, the braze filler 16 includes a flux component and a filler component, it being understood that flux is not an essential component. FIG. 4 illustrates a braze filler spot 16 of 0.7 grams of 6% silver paste. As used in the present application, the term "paste" is used generically to include braze filler, solder, welding compound, etc. with or without a flux-type material as a component.

Method

In the preferred method, the fluid distributor 10 is manufactured beginning with the prefabricated body 12 as illustrated in FIG. 3. The elongated tubular extensions 14 are then fitted into the respective bores 30 as shown in FIG. 2. A predetermined amount of braze filler paste 16 is applied generally in the middle of the cavity 24, as illustrated in FIG. 4. The body 12 is heated using conventional means (e.g. gas torch) circumferentially around the periphery 20.

Heating the periphery 20 in turn convection heats the braze filler paste 16. The flux component of the filler paste 16 first separates flowing radially outwardly to wet cavity 24. Further heating melts the filler component of the paste 16 which follows the flow path of the flux. Advantageously, the silver-based paste flows in the direction of the heat. Thus, the paste 16 flows outwardly towards the periphery 20.

The preferred configuration of cavity 24 is as illustrated in FIG. 4 with a slight crown or dome in the central location to radially outwardly bias the flow of the flux and filler of the paste 16. A generally flat bottom 28 is illustrated in FIG. 3 as an alternative embodiment. Different types of solders and flux have different wetting and flow characteristics; therefore the configuration of the bottom 28 can be altered to match the characteristics of the paste 16 which will be used. The flange 26 surrounding the cavity 24 has been found effective in retaining most of the paste 16 within the cavity 24 and in promoting uniform distribution of the paste 16 around the extensions 14. Although a groove may be optionally cut around the uppermost portion of the first section 32 adjoining the flange 26, it has been found that such a groove is not necessary. That is, surface adhesion or capillary action generally carries the flux and filler of the paste 16 around the perimeter of each tubular extension 14.

Those skilled in the art will appreciate that the method as described herein is particularly advantageous in many respects. For example, heat is not directly applied to the juncture of the tubular extensions 14 and body 12 mitigating the possibility of damage to the tubular extensions 14. Further, heat is applied in essentially a single operation saving a significant amount of time and energy. Utilizing the present method, the braze filler paste 16 provides an effective bond and seal around each tubular extension 14, and yet does not penetrate into bores 30 which might cause an undesirable restriction in the fluid flow path.

Of course many variations on the preferred embodiment are possible. For example, different numbers of extensions 14 can be secured to the body 12 with cost savings and practicality being more evident the greater the number of extensions. Although it is anticipated that the present method be utilized for securing tubular extensions to a fluid handling body, the method hereof has practical utility in connecting practically any type of extension to a superstructure or body. Finally, the exact configuration of the cavity 24 may be varied as long as a communication flow path is provided from the cavity to convey the paste 16 around the extensions 14.

I claim:

1. A method for attaching fluid-handling extensions to a fluid-handling body comprising the steps of:

providing a fluid-handling body having a fluid flow passageway at one end, a cavity at the other end, and a plurality of bores extending between said other end and the passageway, the bores being in communication with the cavity;

placing an elongated, tubular, fluid-handling extension in each of the respective bores extending outwardly from the body, the extensions each being in adjoining relation to the cavity;

applying a paste in the cavity;

heating the body to effect flow of the paste in the cavity into circumscribing relation about the extensions to sealingly connect the extensions to the body.

2. The method according to claim 1, wherein said heating occurs along the outer periphery of the body.

3. The method according to claim 1, wherein said paste includes a flux component and a filler component, said heating step first causing the flux to flow and the filler to follow the flux flow path.

4. The method according to claim 1, said cavity being generally circular and centrAlly domed, said paste being applied generally in the center of the cavity, the heat melting the paste causing outward flow of the paste.

5. A fluid distributor comprising:
an elongated body having
- a passageway extending inwardly from one end of the body,
- a generally open cavity at the other end of the body, the cavity having a retaining flange along the outer perimeter,
- a plurality of bores extending between the other end and the passageway,
- the cavity extending to the bores to provide communication therewith;

a plurality of tubular extensions operatively received in the respective bores; and paste means received in said cavity for sealing the extensions in the respective bores.

6. The distributor according to claim 5, wherein each bore presents a first section adjacent the cavity dimentioned to be slightly greater than the outside dimension of the respective tubular extension.

7. The distributor according to claim 5, wherein each bore presents a second section adjacent the passageway dimensioned for preventing insertion of the respective tubular extensions therein.

8. The distributor according to claim 5, said bores being oriented to extend obliquely radially outwardly from said passageway.

9. The distributor according to claim 5, said cavity comprising a generally saucer-like indentation in the body surface, said flange operable to retain said paste generally within said cavity.

10. The distributor according to claim 9, said cavity defining surface being generally circular in plan and generally convex in cross-section to define a dome in a central location.

11. The distributor according to claim 9, said bores extending inwardly from said cavity adjacent said flange.

12. The distributor according to claim 9, said paste means being operable to melt in response to heat to flow as a liquid in the cavity into circumscribing relation about said extension.

13. A fluid distributur comprising:
an elongated fluid-handling body;
a saucer-like cavity in one end of the body having a retainer flange along the outer perimeter;
structure defining one or more bores extending through said one end into said body, each bore having at least a portion disposed within said cavity inside of said retainer flange;
a fluid-handling extension received in each bore; and
paste means received in said cavity and extending in circumscribing, sealing, relation around each extension.

14. The distributor according to claim 13, including structure defining an elongated passageway in said other end of the body in communication with the bores.

15. The distributor according to claim 13, said cavity being centrally domed for urging paste means applied in the center of the cavity to flow outwardly toward the retainer flange when the paste means is heated.

16. The distributor according to claim 13, each bore-defining structure being cylindrical with the circular cross-section of the end adjacent the cavity being intersected by the retainer flange.

* * * * *